4 Sheets—Sheet 1.

S. WHITESIDES.
SAW SHARPENING AND SETTING MACHINE.

No. 191,212. Patented May 22, 1877.

Witnesses:
Jas. C. Hutchinson.

Inventor:
Samuel Whitesides
Redson Bros.
Attorneys

N. PETERS, PHOTO-LITHOGRAPHER, WASHINGTON, D. C.

4 Sheets—Sheet 2.
S. WHITESIDES.
SAW SHARPENING AND SETTING MACHINE.
No. 191,212. Patented May 22, 1877.
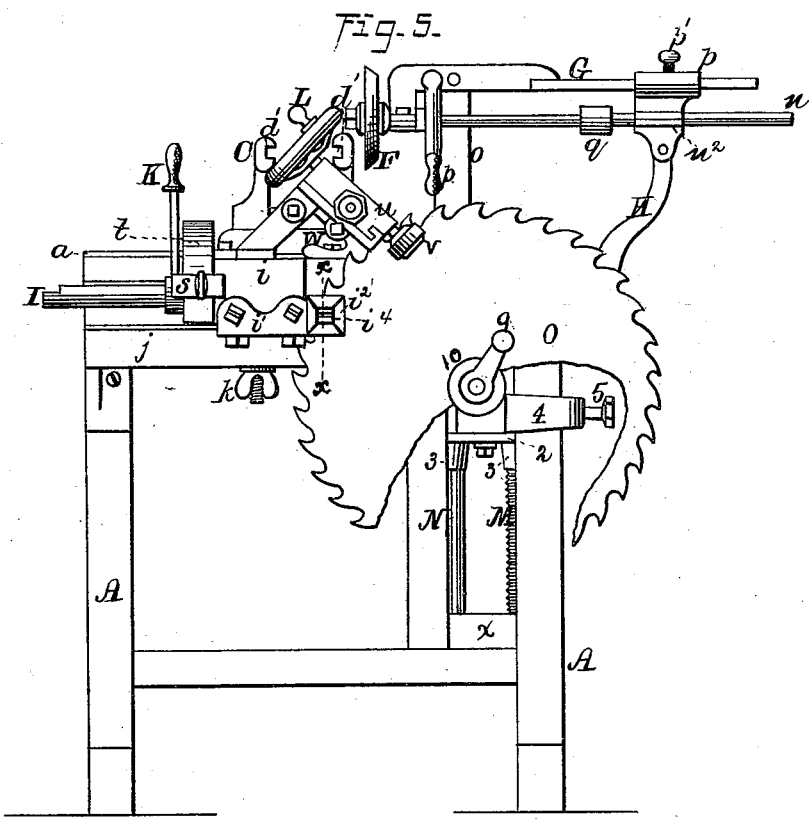
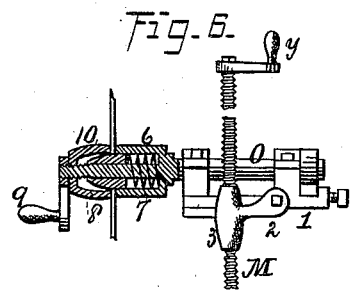
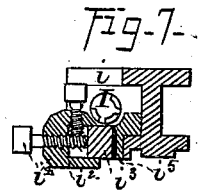
WITNESSES
Jas. E. Hutchinson
Wm. Mister
INVENTOR
Samuel Whitesides
Edson Bro's.
Attorneys.

S. WHITESIDES.
SAW SHARPENING AND SETTING MACHINE.

No. 191,212. Patented May 22, 1877.

Witnesses:
Jas. E. Hutchinson.
J. Wm. Kifter.

Inventor:
Samuel Whitesides
Edson Bro't.
Attorneys

S. WHITESIDES.
SAW SHARPENING AND SETTING MACHINE.
No. 191,212. Patented May 22, 1877.
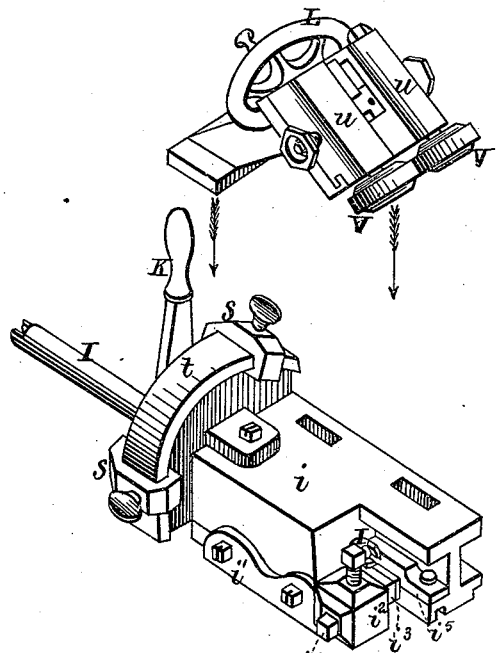
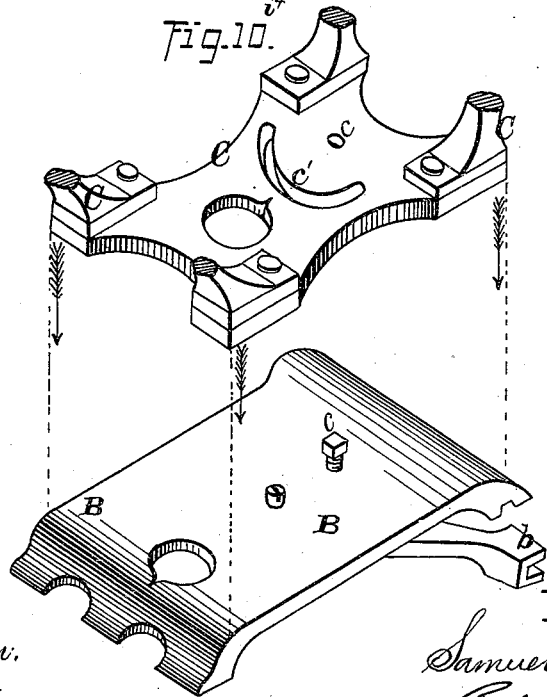

UNITED STATES PATENT OFFICE.

SAMUEL WHITESIDES, OF WEST DEPERE, WISCONSIN.

IMPROVEMENT IN SAW SHARPENING AND SETTING MACHINES.

Specification forming part of Letters Patent No. 191,212, dated May 22, 1877; application filed March 10, 1877.

*To all whom it may concern:*

Be it known that I, SAMUEL WHITESIDES, of West Depere, in the county of Brown and State of Wisconsin, have invented certain new and useful Improvements in Saw Gumming, Filing, and Setting Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
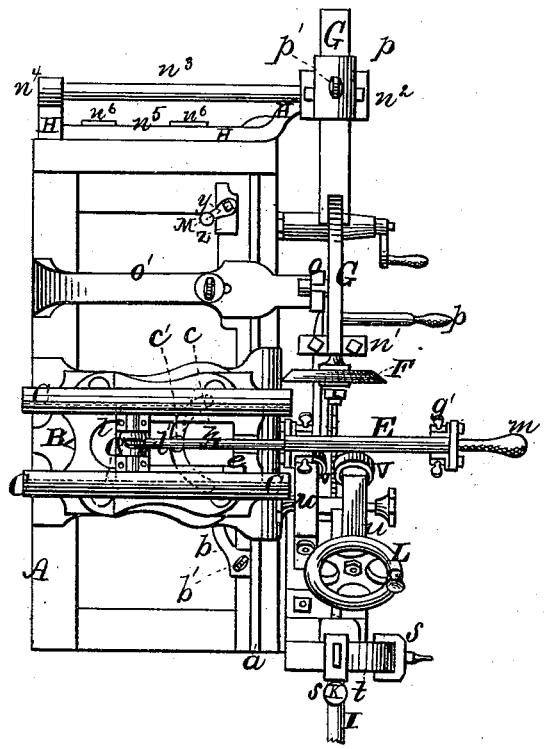
Figure 2:
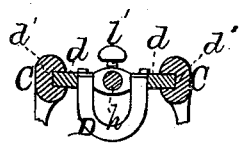
Figure 3:
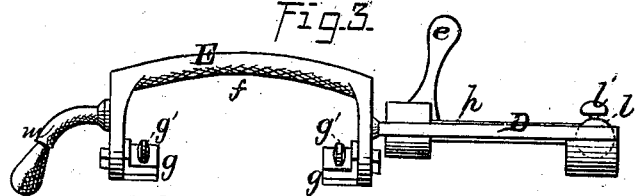
Figure 4:
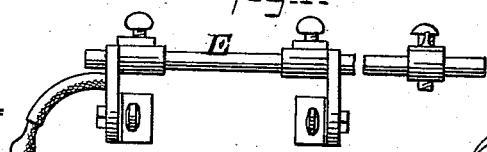
Figure 8:
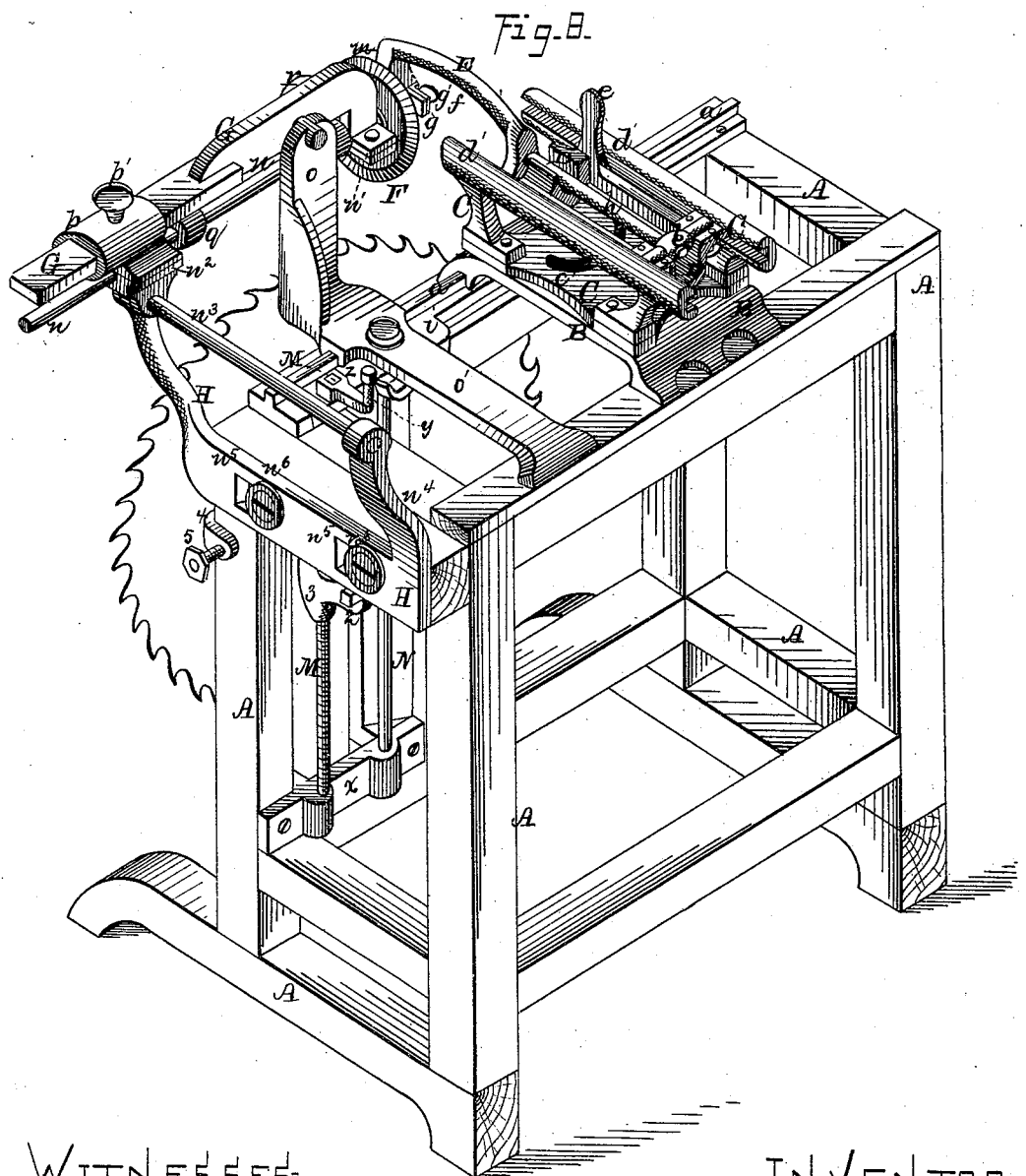

Figure 1, Sheet 1, is a plan view of my improved saw gumming, filing, and setting machine; Fig. 2, a detached sectional view thereof; and Figs. 3 and 4, views of the file-holders. Fig. 5, Sheet 2, is a side view of the machine. Fig. 6 is also a detached sectional view thereof. Fig. 7 is a section through the dotted lines $x\ x$ of Fig. 5. Fig. 8, Sheet 3, is a perspective view of my machine, with the saw-setting mechanism removed. Fig. 9, Sheet 4, is detached perspective views of a part of the gumming mechanism and of the setting mechanism; and Fig. 10, same sheet, is similar views of the base of the file-holding mechanism frame or support, and the bridge supporting and upon which the latter can be horizontally revolved.

Corresponding parts in the several figures are denoted by like letters.

This invention relates to a certain improvement in saw gumming, filing, and setting machines; and it consists of mechanism substantially as hereinafter more fully set forth and claimed.

In the annexed drawing, A refers to a frame, upon which is fastened a rail, $a$. B is a bridge spanning the frame A, and embracing the rail $a$, to permit of its adjustment thereon, as occasion may require. The bridge B is provided with a clamp, $b$, and set-screw $b'$, to secure it in position upon the frame A. Upon the bridge B is placed a frame, C, which can be partially revolved upon a pin, $c$, in the bridge B, a guide-pin entering a curved or semicircular slot, $c'$, in the bottom of said frame, to permit of the latter being swung to one side. D is a carriage, having flanges $d\ d$, entering grooves $d'\ d'$ in the frame C, to allow the carriage to be run back and forth. The carriage D is provided with a gage-post or handle, $e$. E is the file-holder, consisting of a bow, $f$, supplied with clamps and set-screw $g\ g'$, to permit of the adjustment thereto of the file, and at one end with a rod, $h$, entering a rock-shaft, $l$, in the carriage D, having a set-screw, $l'$, for securing the said rod therein, and at its opposite end with a handle, $m$, by which the file is operated. F is the gummer or rotary sharpener, which may be an emery-wheel secured upon a shaft, $n$, having its bearings in boxes $n^1\ n^2$, $n^1$ depending from the bar or plate G, supported upon a standard, $o$, having a right-angular plate or foot, $o'$, embracing the rail $a$, to permit of the adjustability of the standard $o$. The other box, $n^2$, is supported upon, and pivoted to, an upright, H, to allow the said shaft to be tilted, and the gummer thus elevated. The pivot or axis of the box $n^2$ is preferably extended, as at $n^3$, and supported in an upright, $n^4$, formed with a horizontal portion, $n^5$, of the upright H. The upright H is provided with slots, which receive set-screws $n^6\ n^6$, to permit of the adjustment of the gummer toward and from the saw. The bar or plate G passes through an eye, $p$, in the upper half of the box $n^2$, having a set-screw, $p'$, to secure the said bar therein. The shaft $n$ may be driven by a pulley, $q$, and belt, connecting with a suitable motor. A handle depends from the bar or plate G, for tilting the latter. I is the saw-set, consisting of a bifurcated rod, which grasps a tooth of the saw, and bends the same as it is partially rotated. Fig. 5 shows the saw in position to have its teeth set. The rod or set I bears in a block or other support, $i$, and is disposed endwise to the saw.

The support or block $i$ moves upon rails $j$, affixed to one side of the frame A, to permit of the adjustment of the set with reference to the saw, and is provided upon its lower side with adjusting-screw $k$. A handle or lever, K, is attached to the set or rod I to manipulate it.

Gages $s\ s$, having set-screws, are clamped or adjusted to a segment or arc, $t$, of the support $i$, to regulate or limit the movement of the lever K in giving the desired set to the saw-teeth. To one side of the block or support $i$ is attached a plate, $i^1$, to the forward end of which, and beyond the support $i$, is secured a hollow block, $i^2$, to receive a movable jaw, $i^3$, which is operated by a set-screw, $i^4$, and between which and an opposite jaw, $i^5$, the saw is clamped while its teeth are being set. Upon the support $i$ is mounted, in any suitable manner, blocks $u$ $u$, through which pass axes having rollers $v$ $v$, between which the saw is further clamped and held while its teeth are being gummed, filed, or set. A hand-wheel, L, is connected to the axis of one of the rollers $v$ $v$. $w$ is a rest placed beneath the blocks $u$ $u$. M is an upright screw, bearing in a box formed with a plate, $x$, fastened to the frame A, and provided, at its upper end, with a crank, $y$, for its rotation. Opposite the screw is a rod, N, socketed in the plate $x$, and a plate, $z$, through which the upper end of the screw M passes. O is a mandrel bearing in boxes preferably formed upon a plate, 1, screwed or otherwise adjusted to an elevator, 2, having tubular arms 3 3, through which the screw M and rod N pass. To one end of the elevator 2 is attached a clamp, 4, which embraces one of the legs of the frame A, and is provided with a set-screw, 5, for securing it thereto. Formed with the mandrel O is a hollow cylinder, 6, containing a spring, 7, which bears against a cone, 8, upon which is placed the saw to be gummed, &c. The saw is held thereon, and against the cylinder or hub 6, by a handle, 9, screwed on the mandrel O, and an intermediate cone or cylinder, 10. It will be observed, by turning the crank $y$ in the desired direction, the saw can be raised or lowered to adjust it so as to be operated upon by the gummer, &c.

Having thus described my invention, what I claim, and desire to secure by Letters Patent, is—

1. The carriage D, of a U shape, having flanges to enter grooves in the frame C, and a handle or gage-post, $e$, and provided with a rock-shaft, $l$, having a set-screw, $l'$, substantially as and for the purpose set forth.

2. The file-holder E $g$ $g'$, having the handle $m$ and rod $h$, in combination with the carriage D $d$, having the handle $e$ and rock-shaft $l$, with set-screw $l'$, substantially as and for the purpose set forth.

3. The bifurcated rotary bar or rod I, having the lever K, in combination with and bearing in the support $i$, having a segment, $t$, provided with gages $s$ $s$, substantially as and for the purpose set forth.

4. The support $i$, having the plate $i^1$, provided with the hollow block or head $i^2$, having a movable jaw, $i^3$, and set-screw $i^4$, substantially as and for the purpose set forth.

5. The support $i$, having the set-screw $k$, and clamping device $u$ $u$ $v$ $v$, in combination with the rails $j$ of the frame A, substantially as and for the purpose set forth.

6. The gummer-shaft $n$, in combination with and bearing in the box $n^2$, pivoted to the upright H, substantially as and for the purpose set forth.

7. The gummer-shaft $n$, having its bearings or boxes $n^1$ $n^2$, attached to and in combination with the bar or plate G, supported upon the standard $o$ $o'$, and in the eye P, having a set-screw, P', upright H, having slots and set-screws $n^6$ $n^6$, and pivot or axis $n^3$, substantially as and for the purpose set forth.

8. The elevator 2 3, in combination with the screw M $y$ and rod N, substantially as and for the purpose set forth.

In testimony that I claim the foregoing as my own I hereunto affix my signature in presence of two witnesses.

SAMUEL WHITESIDES.

Witnesses:
  GEORGE BENNETT,
  THOMAS JACKSON.